United States Patent
Getzinger et al.

(10) Patent No.: US 9,383,508 B2
(45) Date of Patent: Jul. 5, 2016

(54) MULTI-WING EDGE-LIT STRUCTURE

(71) Applicants: William Edward Getzinger, Aurora, CO (US); Marc Raymond O'Leary, Aurora, CO (US); Bradley Stephen Garrett, Evergreen, CO (US); Travis William Francis Boyle, Denver, CO (US)

(72) Inventors: William Edward Getzinger, Aurora, CO (US); Marc Raymond O'Leary, Aurora, CO (US); Bradley Stephen Garrett, Evergreen, CO (US); Travis William Francis Boyle, Denver, CO (US)

(73) Assignee: Cooper Technologies Company, Houston, TX (US)

(*) Notice: Subject to any disclaimer, the term of this patent is extended or adjusted under 35 U.S.C. 154(b) by 108 days.

(21) Appl. No.: 14/257,659

(22) Filed: Apr. 21, 2014

(65) Prior Publication Data

US 2014/0313778 A1    Oct. 23, 2014

Related U.S. Application Data

(60) Provisional application No. 61/814,104, filed on Apr. 19, 2013.

(51) Int. Cl.
*F21V 7/04*      (2006.01)
*F21V 8/00*      (2006.01)

(52) U.S. Cl.
CPC ............ *G02B 6/0088* (2013.01); *G02B 6/0078* (2013.01)

(58) Field of Classification Search
CPC ......... F21V 15/01; F21V 21/14; F21V 21/30; F21V 23/001; F21V 19/004; F21V 23/023; F21V 21/03; F21V 21/26; F21V 21/28
USPC .................. 362/362, 371, 418, 427
See application file for complete search history.

(56) References Cited

U.S. PATENT DOCUMENTS

| | | | |
|---|---|---|---|
| 6,945,668 B1 | 9/2005 | Orlov et al. | |
| D581,080 S | 11/2008 | Mier-Langner | |
| D586,934 S | 2/2009 | Ogashiwa | |
| D627,909 S | 11/2010 | Hu et al. | |
| D645,185 S | 9/2011 | Chen et al. | |
| D661,421 S | 6/2012 | Hor et al. | |
| D700,726 S | 3/2014 | Kim et al. | |
| D711,577 S | 8/2014 | Zhan | |
| 2002/0071267 A1* | 6/2002 | Lekson | F21S 48/215 362/610 |
| 2008/0212329 A1 | 9/2008 | Duguay et al. | |
| 2009/0168422 A1* | 7/2009 | Chiu | F21S 2/005 362/249.03 |
| 2011/0032696 A1* | 2/2011 | Kim | F21S 2/005 362/184 |
| 2011/0216532 A1 | 9/2011 | Bryant et al. | |
| 2012/0300437 A1* | 11/2012 | Lu | F21V 21/005 362/147 |
| 2012/0320627 A1 | 12/2012 | Araki et al. | |
| 2013/0016469 A1* | 1/2013 | Galerne | G06F 1/1656 361/679.21 |

FOREIGN PATENT DOCUMENTS

WO    WO 2014/031155    2/2014

OTHER PUBLICATIONS

International Search Report for PCT/US2014/034812, mailed Aug. 7, 2014.

* cited by examiner

*Primary Examiner* — William Carter
(74) *Attorney, Agent, or Firm* — King & Spalding LLP

(57) ABSTRACT

A multi-wing edge-lit structure includes a first edge-lit light guide panel, a second edge-lit light guide panel, and a joiner unit. The first edge-lit light guide panel is adjustably attached to the joiner unit on a first side of the joiner unit. The second edge-lit light guide panel is adjustably attached to the joiner unit on a second side of the joiner unit. The first side and the second side are opposite sides of the joiner unit.

20 Claims, 16 Drawing Sheets

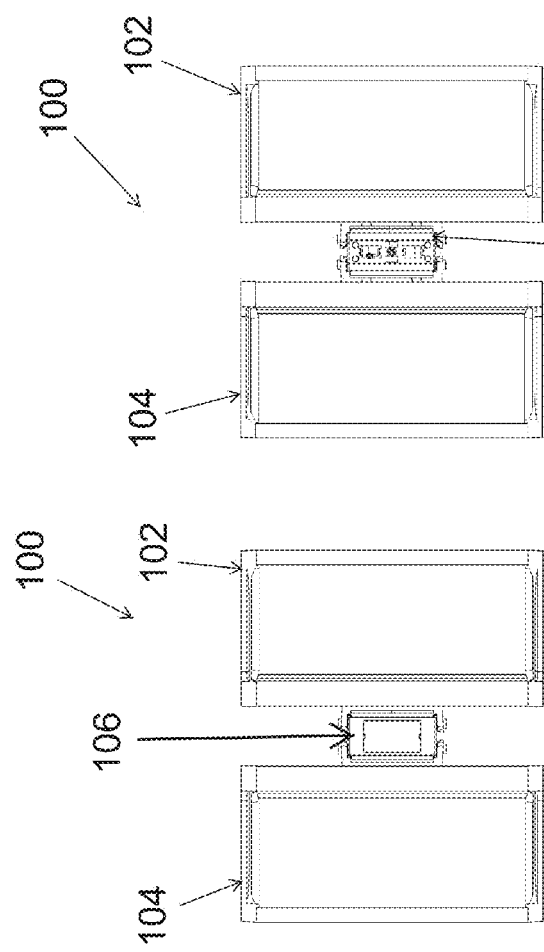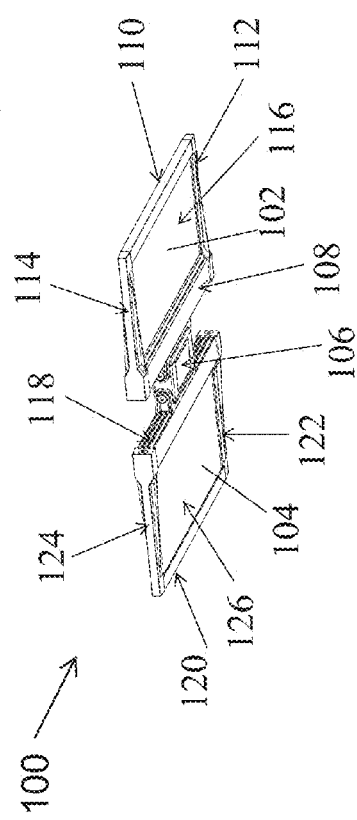

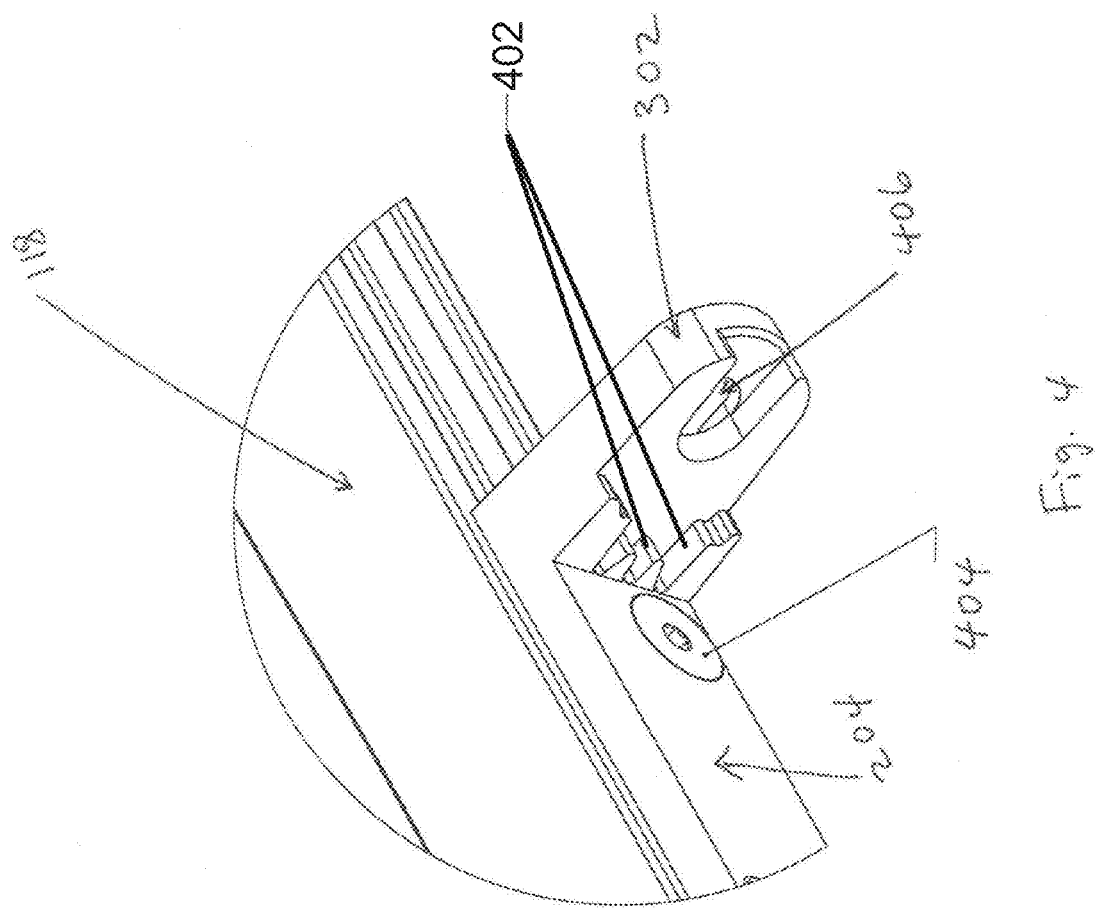

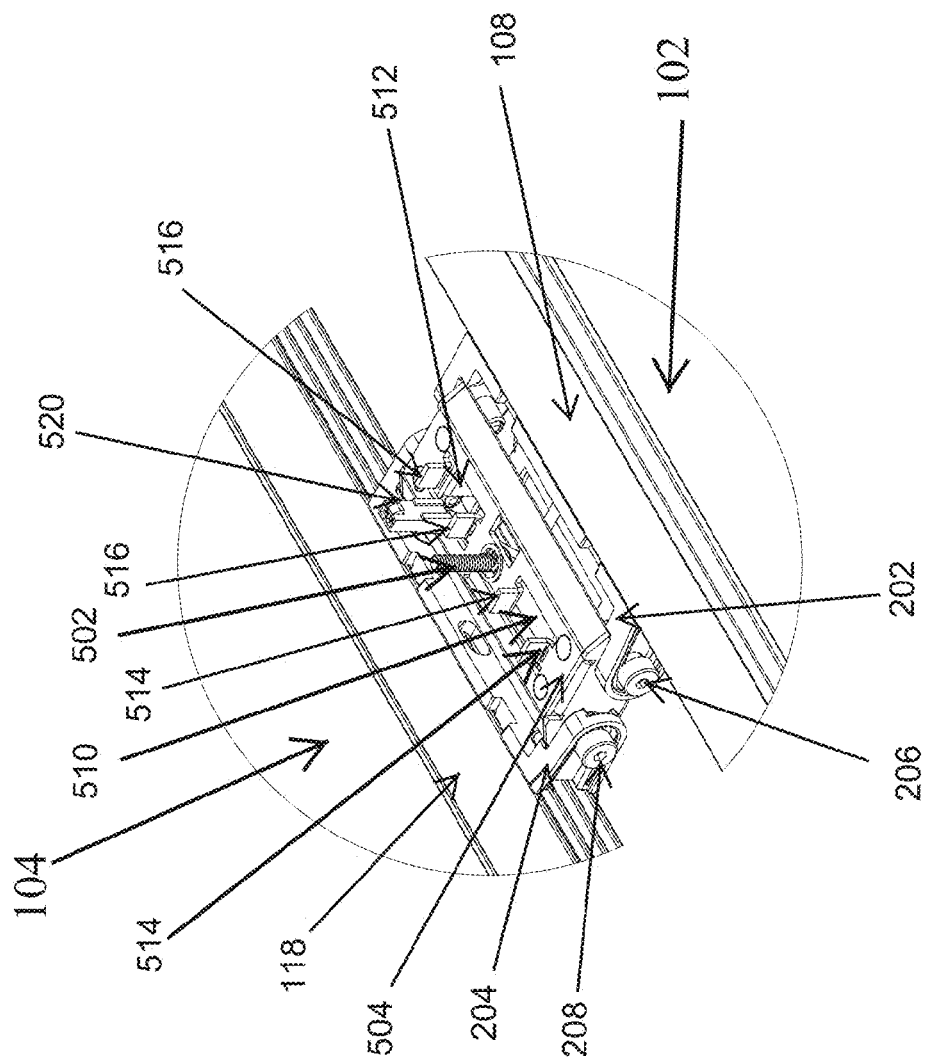

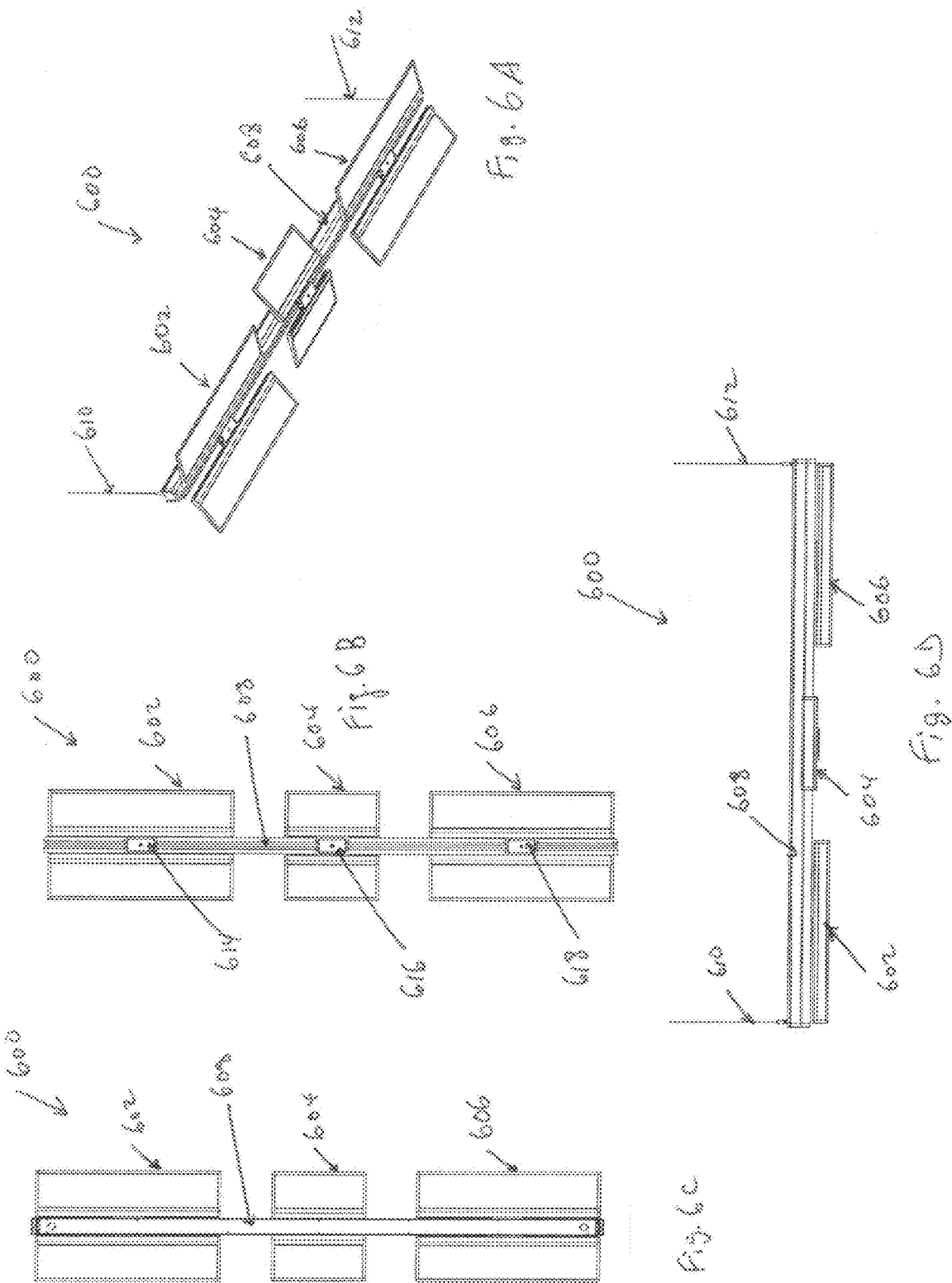

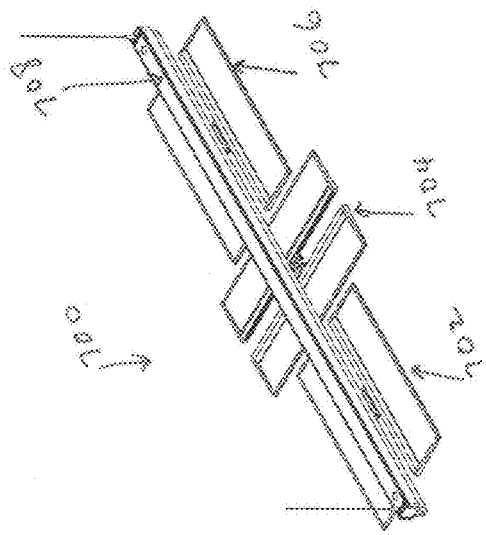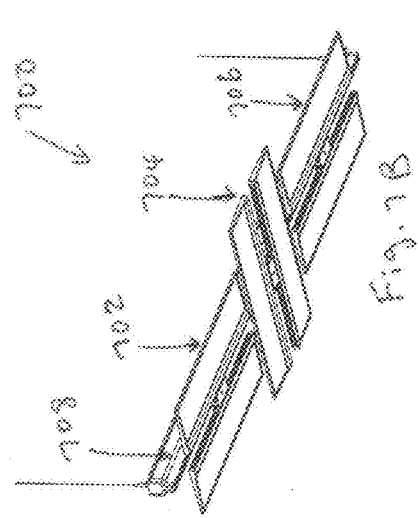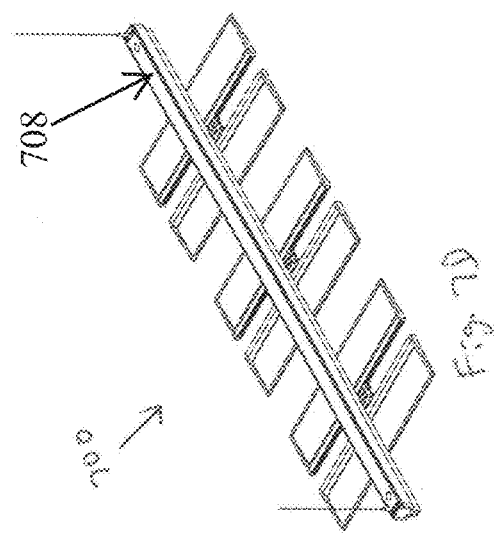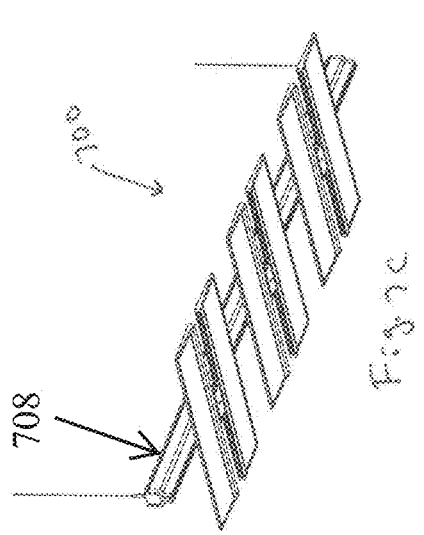

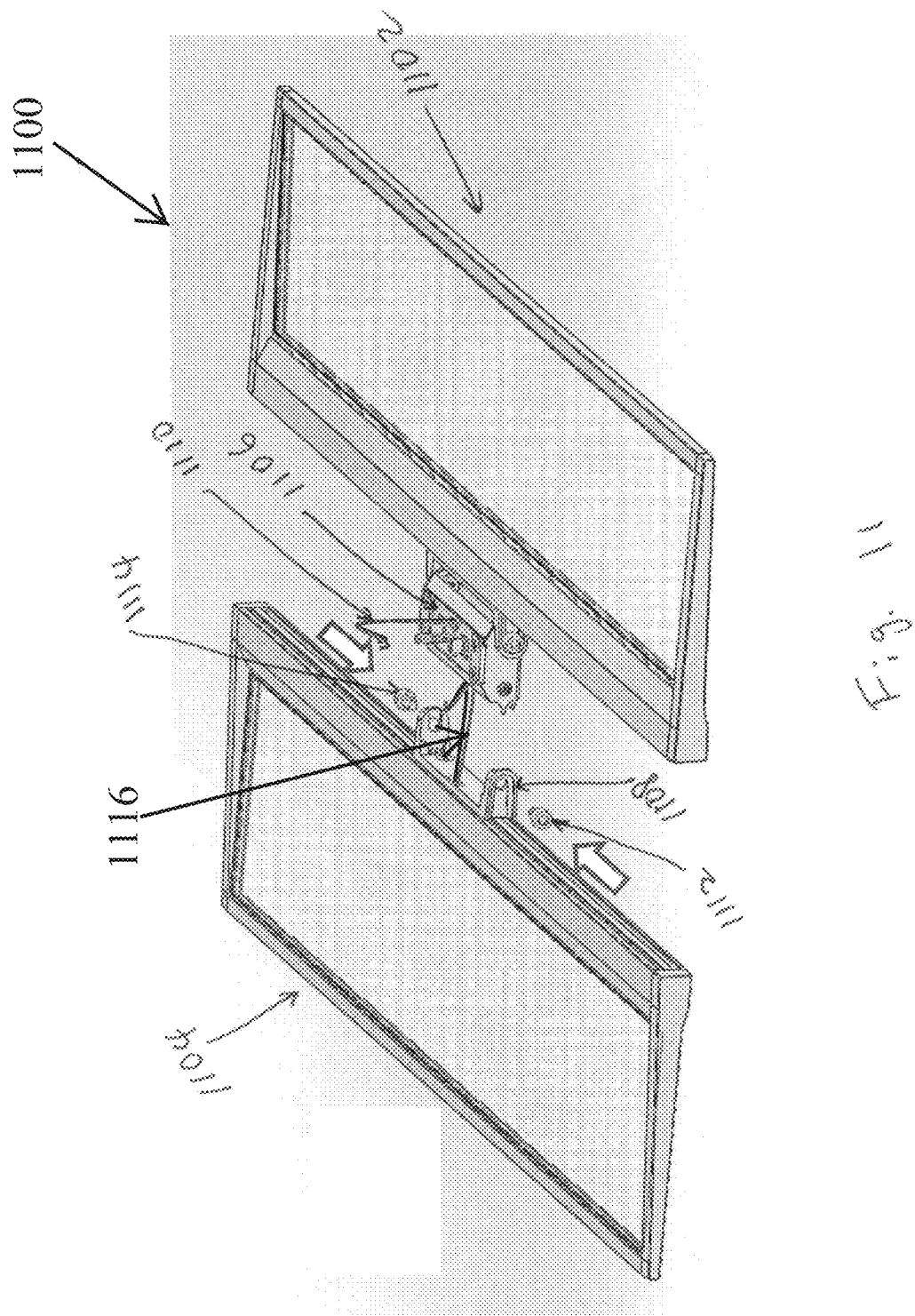

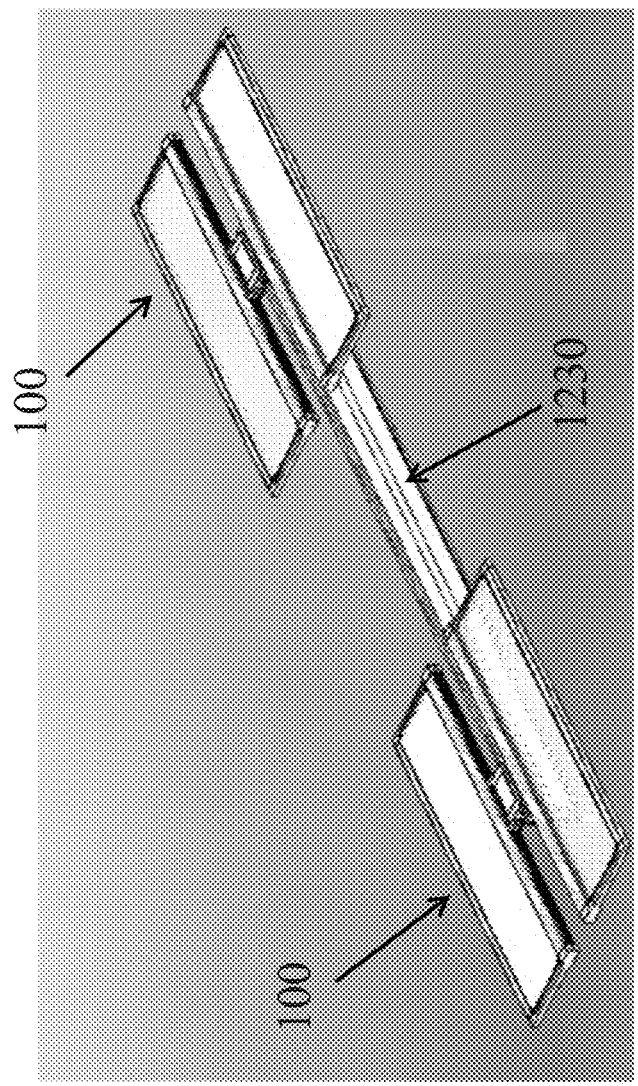

MULTI-WING EDGE-LIT STRUCTURE

CROSS REFERENCE TO RELATED APPLICATIONS

The present application claims priority under 35 U.S.C. Section 119(e) to U.S. Provisional Patent Application No. 61/814,104, filed Apr. 19, 2013, and titled "MULTI-WING EDGE-LIT STRUCTURE," the entire content of which is incorporated herein by reference.

TECHNICAL FIELD

The present disclosure relates generally to lighting solutions, and more particularly to an adjustable edge-lit light structure that has multiple edge-lit light guide panels.

BACKGROUND

An edge-lit luminaire generally has an edge-lit light guide (or sometimes referred to as wave guide). A portion of light from one or more light emitting diodes (LEDs) that enters the light guide may be emitted by the light guide. For example, a portion of light from the LEDs enters the light guide through a narrow side of the waveguide and is emitted by the light guide through one or more broad sides of the light guide.

In some situations, a single luminaire may not be able to provide a desired level of illumination. Further, a light distribution other than that provided by a single luminaire may also be desired. For example, multiple edge-lit or other kinds of luminaires may be needed to provide adequate illumination of an area. In such cases, a configuration of multiple luminaires may be needed to provide the desired level of illumination as well as the desired lighting distribution. However, installing multiple standalone luminaires may not be practical in all situations. For example, space may not be available to accommodate installation of multiple standalone luminaires. Further, installation of multiple standalone luminaires may be relatively expensive and time consuming.

Thus, a solution that provides a desired level of illumination and light distribution at reasonable cost and space may be desirable.

SUMMARY

In general, the present disclosure relates to an adjustable edge-lit light structure. In an example embodiment, a multi-wing edge-lit structure includes a first edge-lit light guide panel, a second edge-lit light guide panel, and a joiner unit. The first edge-lit light guide panel is adjustably attached to the joiner unit on a first side of the joiner unit. The second edge-lit light guide panel is adjustably attached to the joiner unit on a second side of the joiner unit. The first side and the second side are opposite sides of the joiner unit.

In another example embodiment, a multi-wing edge-lit light fixture includes a multi-wing edge-lit structure that includes a first edge-lit light guide panel, a second edge-lit light guide panel, and a joiner unit. The first edge-lit light guide panel is adjustably attached to the joiner unit on a first side of the joiner unit. The second edge-lit light guide panel is adjustably attached to the joiner unit on a second side of the joiner unit. The first side and the second side are opposite sides of the joiner unit. The multi-wing edge-lit light fixture also includes a channel unit attached to the joiner unit. The channel unit includes a driver that provides power to the multi-wing edge-lit structure.

In another example embodiment, a multi-wing edge-lit light fixture includes a first multi-wing edge-lit structure, a second multi-wing edge-lit structure, and a channel unit attached to the first multi-wing edge-lit structure and to the second multi-wing edge-lit structure. The first multi-wing edge-lit structure and the second multi-wing edge-lit structure each includes a first edge-lit light guide panel, a second edge-lit light guide panel, and a joiner unit. The first edge-lit light guide panel is adjustably attached to the joiner unit on a first side of the joiner unit. The second edge-lit light guide panel is adjustably attached to the joiner unit on a second side of the joiner unit. The first side and the second side are opposite sides of the joiner unit.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein:

FIGS. 1A-C illustrate a multi-wing edge-lit structure that has multiple edge-lit light guide panels according to an example embodiment;

FIG. 4 illustrates a close-up view of a portion of an edge-lit light guide panel of FIG. 3B according to an example embodiment;

FIG. 5 illustrates a close-up view of a joiner unit of the multi-wing edge-lit structure of FIGS. 1A-C according to an example embodiment;

FIGS. 6A-D illustrate a multi-wing edge-lit light fixture that includes multiple multi-wing edge-lit structures in various orientations according to an example embodiment;

FIGS. 7A-D illustrate a multi-wing edge-lit light fixture that includes multiple multi-wing edge-lit structures in various orientations according to an example embodiment;

FIG. 11 illustrates a step for assembling the multi-wing edge-lit structure according to an example embodiment; and FIGS. 12A-I illustrate steps for assembling a channel unit for attachment to the multi-wing edge-lit structure of FIGS. 1A-C according to an example embodiment.

Figure 2B:
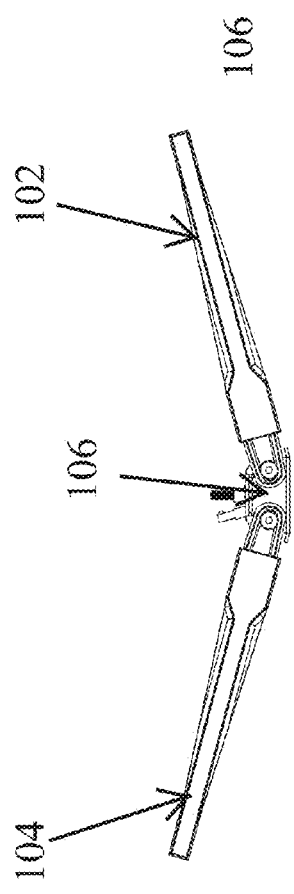
FIGS. 2A-C illustrate the multi-wing edge-lit lighting structure of FIGS. 1A-C adjusted to have particular orientations according to an example embodiment.

The drawings illustrate example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Turning now to the figures, particular embodiments are described. FIGS. 1A-C illustrate a multi-wing edge-lit structure 100 that has multiple edge-lit light guide panels according to an example embodiment. FIG. 1A is a perspective view of the multi-wing edge-lit structure 100. FIG. 1B is a bottom view of the multi-wing edge-lit structure 100. FIG. 1C is a top view of the multi-wing edge-lit structure 100. The multi-wing edge-lit structure 100 may be incorporated in a light fixture that provides illumination for an area around the light fixture. In some example embodiments, the multi-wing edge-lit structure 100 may be used in a light fixture that is attached to a structure, such as a ceiling, in a number of different ways. For example, a light fixture that includes the multi-wing edge-lit structure 100 may be suspended from a ceiling. Alternatively, such a light fixture may be directly mounted to a ceiling. Referring to FIGS. 1A-C, the multi-wing edge-lit structure 100 includes a first edge-lit light guide panel 102, a second edge-lit light guide panel 104, and a joiner unit 106. The first edge-lit light guide panel 102 also includes a light guide 116. The first edge-lit light guide panel 102 also includes a back frame 108, a front frame 110, a first side frame 112, and a second side frame 114.

The back frame 108, the front frame 110, the first side frame 112, and the second side frame 114 are positioned around the light guide 116. To illustrate, the back frame 108 and the front frame 110 are positioned at opposite narrow sides of the light guide 116. The first side frame 112 and the second side frame 114 extend between the back frame 108 and the front frame 110 at the other opposite narrow sides of the light guide 116. The light guide 116 is designed to emit light through one or both broad sides of the light guide 116. For example, the first edge-lit light guide panel 102 may include one or more light emitting diodes (LEDs) or other light sources that are positioned within the back frame 108.

To illustrate, the one or more LEDs may be disposed on a printed circuit board (PCB)) that is positioned within the back frame 108. A narrow side of the light guide 106 may also be positioned within the back frame and close to the one or more LEDs. Light from the LEDs may enter the light guide 116 through the particular narrow side of the light guide 116 and may be emitted through one or both broad sides of the light guide 116.

In some example embodiments, light guide 110 may be made from acrylic, and the back frame 108, the front frame 110, the first side frame 112, and the second side frame 114 may be made from aluminum or another metal. For example, the back frame 108 may serve as a heat sink to dissipate heat from the LEDs.

As illustrated in FIGS. 1A-C, the second edge-lit light guide panel 104 includes a back frame 118, a front frame 120, a first side frame 122, and a second side frame 124. The back frame 118, the front frame 120, the first side frame 122, and the second side frame 124 are positioned around a light guide 126. To illustrate, the back frame 118 and the front frame 120 are positioned at opposite narrow sides of the light guide 126. The first side frame 122 and the second side frame 124 extend between the back frame 118 and the front frame 120 at the other opposite narrow sides of the light guide 126.

The light guide 126 is designed to emit light through one or both broad sides of the light guide 116. For example, the first edge-lit light guide panel 104 may include one or more LEDs or other light sources that are positioned within the back frame 118. To illustrate, the one or more LEDs may be disposed on a printed circuit board (PCB)) that is positioned within the back frame 118. A narrow side of the light guide 126 may also be positioned within the back frame and close to the one or more LEDs. Light from the LEDs may enter the light guide 116 through the particular narrow side of the light guide 126 and may be emitted through one or both broad sides of the light guide 126.

In some example embodiments, light guide 110 may be made from acrylic, and the back frame 108, the front frame 110, the first side frame 112, and the second side frame 114 may be made from aluminum or another metal. For example, the back frame 108 may serve as a heat sink to dissipate heat from the LEDs.

In some example embodiments, the first edge-lit light guide panel 102 is adjustably attached to the joiner unit 106 on a first side of the joiner unit 106. Similarly, the second edge-lit light guide panel 104 is adjustably attached to the joiner unit 106 on a second side of the joiner unit 106, where the first side and the second side are opposite sides of the joiner unit 106. For example, the first edge-lit light guide panel 102 and the second edge-lit light guide panel 104 may be rotatable relative to the joiner unit 106 to change the positions of the first edge-lit light guide panel 102 and the second edge-lit light guide panel 104. Power may be provided to the LEDs in the first edge-lit light guide panel 102 and the second edge-lit light guide panel 104 by routing wires to the joiner unit 106. The joiner unit 106 may be made from a metal such as aluminum using methods such as die casting or other methods known to those of ordinary skill in the art with the benefit of the present disclosure.

Because the multi-wing edge-lit structure 100 includes the first edge-lit light guide panel 102 and the second edge-lit light guide panel 104, the multi-wing edge-lit structure 100 may be used in a light fixture to illuminate an area that would otherwise require two separate light fixtures.

Figure 2A:
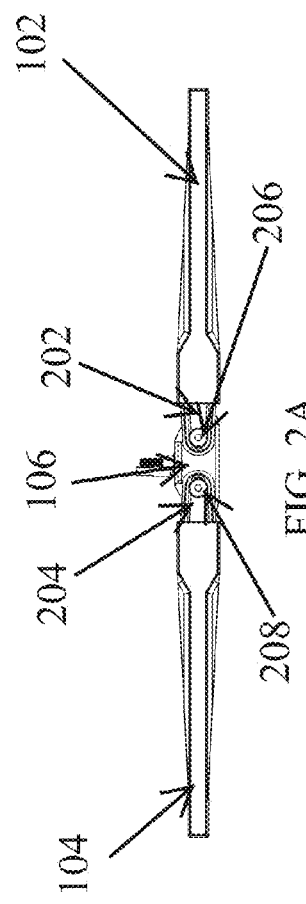
Figure 2C:
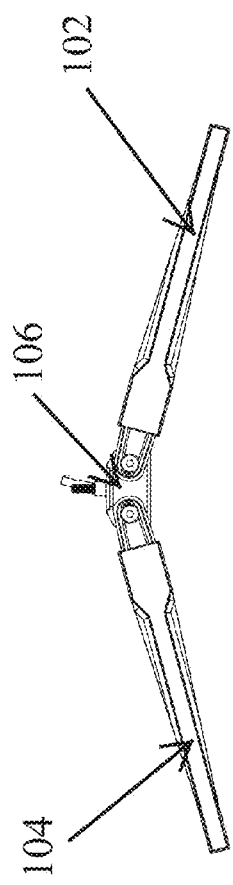

FIGS. 2A-C illustrate the multi-wing edge-lit structure 100 of FIGS. 1A-C in different orientations according to an example embodiment. Referring to FIGS. 2A-C, the first edge-lit light guide panel 102 includes a knuckle 202 that is attached to the joiner unit 106 by at least a fastener 206. The second edge-lit light guide panel 104 includes a knuckle 204 that is attached to the joiner unit 106 by at least a fastener 208. The knuckles 202, 204 may be from aluminum using, for example, a die casting method. As illustrated in FIG. 2A, the first edge-lit light guide panel 102 and the second edge-lit light guide panel 104 may be oriented to be in a substantially horizontal plane extending through the joiner unit 106. Each of the first edge-lit light guide panel 102 and the second edge-lit light guide panel 104 may also be independently adjusted to have other orientations by rotating each edge-lit light guide panel 102, 104 about a respective attachment point defined by the corresponding fastener 206 or 208. For example, as shown in FIG. 2B, the first edge-lit light guide panel 102 and the second edge-lit light guide panel 104 may be in an upward orientation relative to the horizontal plane extending through the joiner unit 106. As shown in FIG. 2C, the first edge-lit light guide panel 102 and the second edge-lit light guide panel 104 may also have a downward orientation relative to the horizontal plane extending through the joiner unit 106.

In some example embodiments, each of the first edge-lit light guide panel 102 and the second edge-lit light guide panel 104 may be rotated down approximately 90 degrees and rotated up approximately 65 degrees about the respective attachment point relative to the horizontal plane extending through the joiner unit 106 (i.e., relative to the respective positions of the first edge-lit light guide panel 102 and the second edge-lit light guide panel 104 shown in FIG. 2A). In an example embodiment, an orientation of each of the first edge-lit light guide panel 102 and the second edge-lit light guide panel 104 may be adjusted by loosening or removing the respective fastener 206 or 208, adjusting the particular edge-lit light guide panel 102, 104 to a desired orientation, and fastening the respective fastener 206 or 208 to firmly attach the edge-lit light guide panel 102, 104 to the joiner unit 106.

Although the first edge-lit light guide panel 102 and the second edge-lit light guide panel 104 are rotated to corresponding positions as shown in FIGS. 2A-C, the first edge-lit light guide panel and the second edge-lit light guide panel are adjustable independent of each other. For example, the first edge-lit light guide panel 102 may be oriented as shown in FIG. 2A, and the second edge-lit light guide panel 104 may be oriented as shown in FIG. 2B or FIG. 2C. As another example, the first edge-lit light guide panel 102 may be oriented as shown in FIG. 2B, and the second edge-lit light guide panel 104 may be oriented as shown in FIG. 2A or FIG. 2C.

Figure 3A:
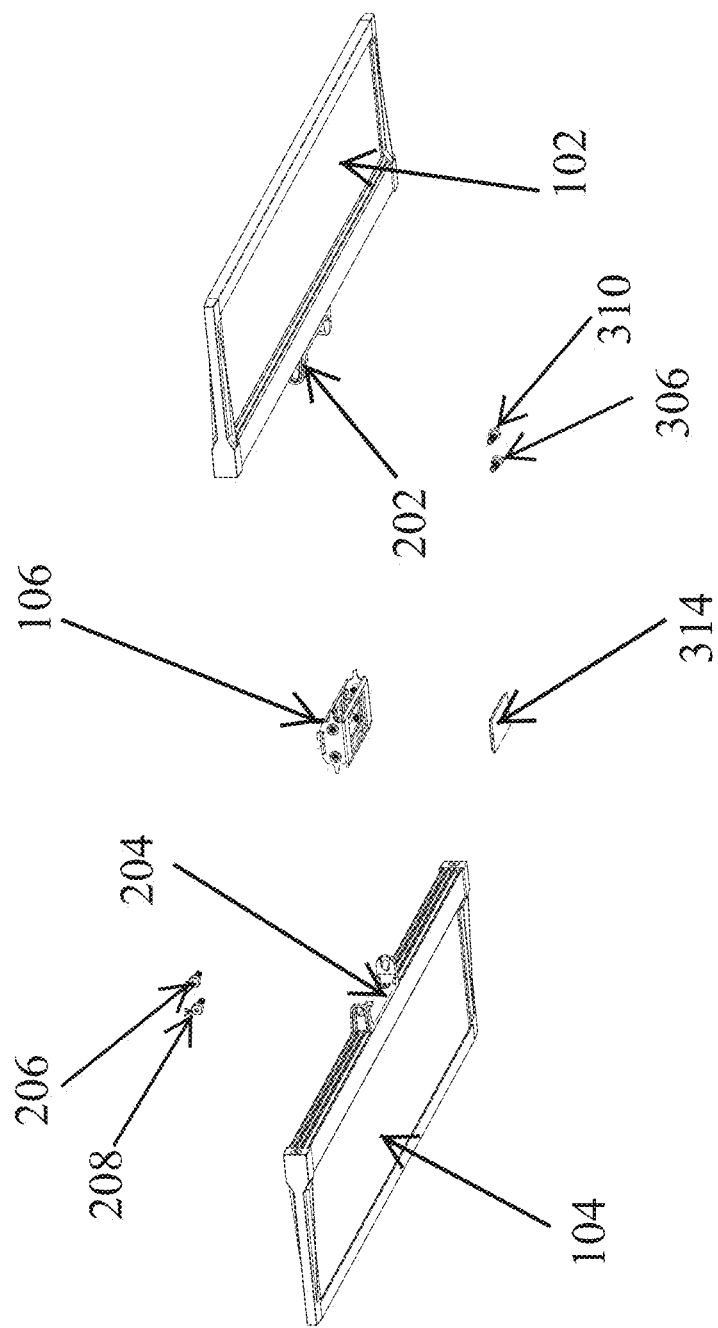
FIGS. 3A and 3B illustrate partially exploded views of the multi-wing structure of FIGS. 1A-C according to an example embodiment.
Figure 3B:
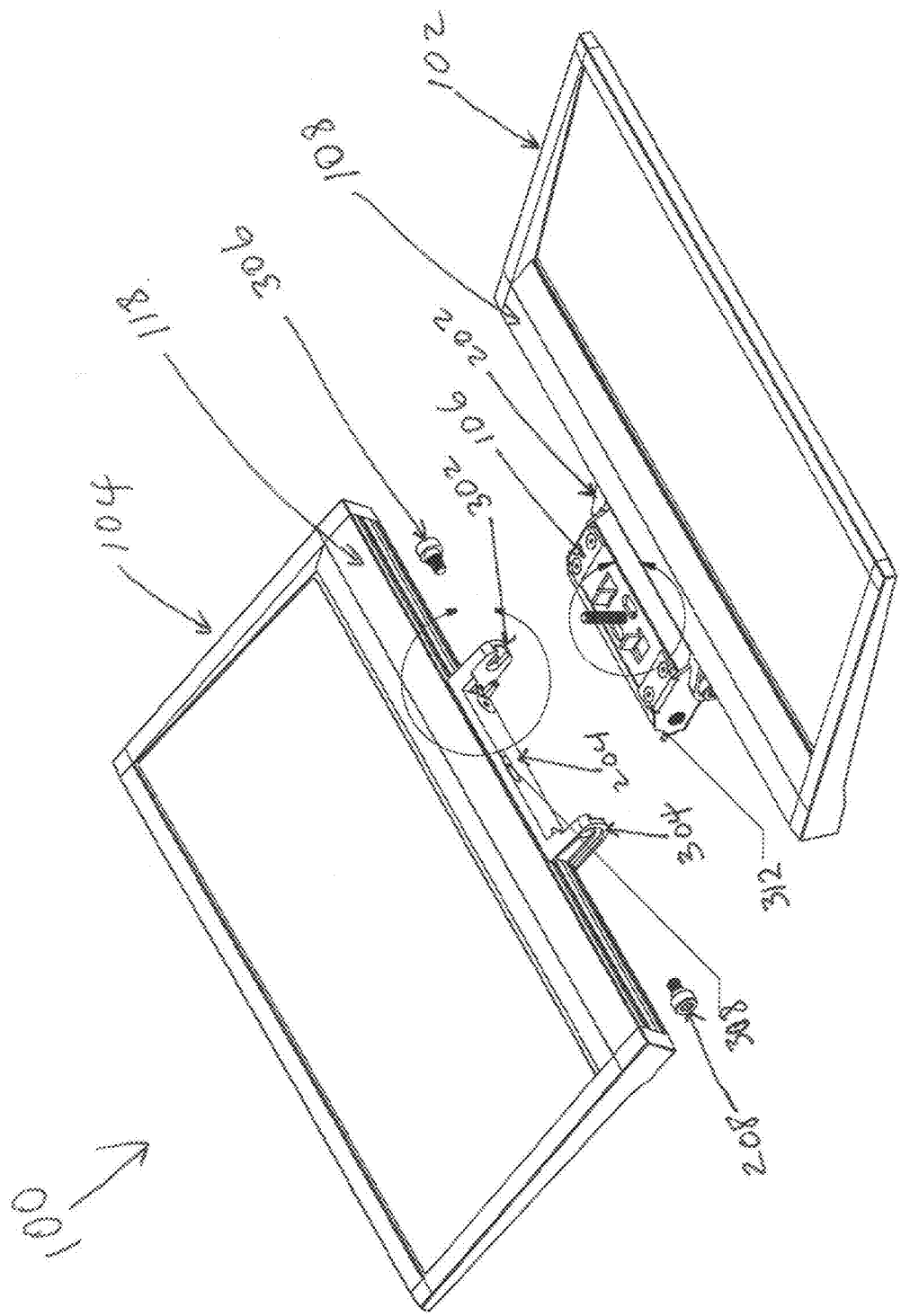

FIGS. 3A and 3B illustrate partially exploded views of the multi-wing structure of FIGS. 1A-C according to an example embodiment. Referring to FIGS. 3A and 3B, the multi-wing edge-lit structure 100 includes the first edge-lit light guide panel 102, the second edge-lit light guide panel 104, and the joiner unit 106. The first edge-lit light guide panel 102 includes the knuckle 202, and the second edge-lit light guide panel 104 includes the knuckle 204. The first edge-lit light guide panel 102 may be attached to the joiner unit 106 using fasteners 206, 310. For example, the fasteners 206, 310 may be inserted into respective holes in the knuckle 202 and the joiner unit 106 to attach the joiner unit 106 to the knuckle 202. Similarly, the second edge-lit light guide panel 104 may be attached to the joiner unit 106 using fasteners 208, 306. For example, the fasteners 208, 306 may be inserted into respective holes in the knuckle 204 and the joiner unit 106 to attach the joiner unit 106 to the knuckle 204.

In some example embodiments, the joiner unit 106 includes a cover 314. The cover 314 is a removable cover that provides access to the inside of the joiner unit 106. For example, routing of wires to and from the first edge-lit light guide panel 102 and the second edge-lit light guide panel 104 may be simplified by having access to the inside of the joiner unit 106.

In FIG. 3B, the first edge-lit light guide panel 102 is attached to the joiner unit 106. In particular, the knuckle 202 of the first edge-lit light guide panel 102 is adjustably attached to the joiner unit 106, and the knuckle 202 of the first edge-lit light guide panel 102 is fixedly attached to the back frame 108. As shown in FIG. 3B, the knuckle 204 of the second edge-lit light guide panel 104 is fixedly attached to the back frame 118. The knuckle 204 includes arms 302, 304. The knuckle 204 also includes an opening 308 for routing one or more wires to one or more light sources (e.g., LEDs) of the second edge-lit light guide panel 104 that may be positioned in the back frame 118.

In some example embodiments, the joiner unit 106 includes a protrusion 312 that is designed to be positioned in a corresponding notch of the knuckle 204. (Protrusions 1016, 1020 shown in FIG. 10A correspond to two of the protrusion 312.) After the protrusion 312 and another protrusion of the joiner unit 106 are positioned in respective notches of the knuckle 204 based on a desired orientation of the second edge-lit light guide panel 104, the fasteners 208, 306 may be used to securely attach the second edge-lit light guide panel 104 to the joiner unit 106 by extending through a respective opening in the respective arm 302, 304 and in the joiner unit 106. The joiner unit 106 may be attached to the knuckle 202 of the first edge-lit light guide panel 102 in a similar manner described above with respect to the knuckles 204. For example, the knuckle 202 may have the same features described above with respect to the knuckle 204.

FIG. 4 illustrates a close-up view of a portion of the edge-lit light guide panel 104 of FIG. 3B according to an example embodiment. As illustrated in FIG. 4, the knuckle 204 is attached to the back frame 118 of the second edge-lit light guide panel 104 by a fastener 404. The knuckle 204 also includes an aperture 406 through the arm 302 and a corresponding aperture through the arm 304 (shown in FIG. 3B). The aperture 406 allows the fastener 306 to be inserted therethrough to attach the knuckle 204 to the joiner unit 106.

The knuckle 204 also includes notches 402 that are designed to receive a protrusion (e.g., a protrusion 1020 of FIG. 10A) of the joiner unit 106 that is similar to the protrusion 312 shown in FIG. 3B. In some example embodiments, each notch of the notches 402 corresponds to a particular orientation of the second edge-lit light guide panel 104. For example, each of the orientations of the second edge-lit light guide panel 104 shown in FIGS. 2A-C may correspond to positioning of the protrusion of the joiner unit 106 in a different one of the notches 402. For example, one notch of the notches 402 may correspond to a substantially horizontal orientation of the second edge-lit light guide panel 104 shown in FIG. 2A. Another one of the notches 402 may correspond to the upward orientation (e.g., approximately 15 degrees above the horizontal plane) of the second edge-lit light guide panel 104 shown in FIG. 2A. Yet another notch of the notches 402 may correspond to an orientation where the second edge-lit light guide panel 104 is 15-degrees below the horizontal plane. In some example embodiments, the knuckle 204 may include two sets of matching notches that are each positioned close to or at each arm of the knuckle 204. Although the above description is provided with respect to the second edge-lit light guide panel 104, the description is equally applicable to the first edge-lit light guide panel 102 and the knuckle 202.

FIG. 5 illustrates a close-up view of the joiner unit 106 of the multi-wing edge-lit structure 100 of FIGS. 1A-C according to an example embodiment. The fastener 206 is used to attach the knuckle 202 to the joiner unit 106. Similarly, the fastener 208 is used to attach the knuckle 204 to the joiner unit 106. The joiner unit 106 includes a holding screw 502 and a metal plate 504 (e.g., sheet metal plate). The holding screw 502 extends through the metal plate 504. In some example embodiments, the holding screw 502 is used to attach the multi-wing edge-lit structure 100 to a channel unit shown, for example, in FIGS. 6A-D.

The joiner unit 106 includes wire routing openings 510, 512 that may be used to route one or more wires to the LEDs of the first edge-lit light guide panel 102 and to the LEDs of the second edge-lit light guide panel 104. As described above, the LEDs of the first edge-lit light guide panel 102 may be positioned in the back frame 108, and the LEDs of the second edge-lit light guide panel 104 may be positioned in the back frame 118. As illustrate in FIG. 5, a wire connector 520 extends through the wire routing opening 512. For example, the wire connector 520 may be connected to electrical wires connected to the LEDs of one or both of the first edge-lit light guide panel 102 and the second edge-lit light guide panel 104.

In some example embodiments, the joiner unit 106 includes tabs 514, 516 that extend up from the metal plate 504. The tabs 514 are positioned on one side of the holding screw 502, and the tabs 516 are positioned on another side of the holding screw 502. Although two tabs 514 are shown in FIG. 5, in alternative embodiments, the joiner unit 106 may have fewer or more than two tabs 514. Similarly, in alternative embodiments, the joiner unit 106 may have fewer or more than two tabs 516. The tabs 514, 516 are used to align the multi-wing edge-lit structure 100 with a channel unit (such as a channel unit 608 of FIGS. 6A-D) and with other multi-wing edge-lit structures 100, for example, during attachment of the multi-wing edge-lit structure 100 to the channel unit. For example, the channel unit may include corresponding slots for inserting the tabs 514, 516 therein.

FIGS. 6A-D illustrate a multi-wing edge-lit light fixture 600 that includes multiple multi-wing edge-lit structures in various orientations according to an example embodiment. The light fixture 600 includes a first multi-wing edge-lit structure 602, a second multi-wing edge-lit structure 604, and a third multi-wing edge-lit structure 606. In some example embodiments, each one of the first multi-wing edge-lit structure 602, the second multi-wing edge-lit structure 604, and the third multi-wing edge-lit structure 606 may correspond to the multi-wing edge-lit structure 100 of FIGS. 1A-C. The light fixture 600 also includes a channel unit 608, which may be made at least in part from aluminum.

The multi-wing edge-lit structure 602, 604, 606 are attached to the channel unit 608. For example, each of the multi-wing edge-lit structure 602, 604, and 606 may be attached to the channel unit 608 by a corresponding fastener, such as the holding screw 502 of FIG. 5. Tabs of each joiner unit 614, 616, and 618 (e.g., tabs corresponding to the tabs 514, 516 of the joiner unit 106 shown in FIG. 5) are used to align the respective multi-wing edge-lit structure 602, 604, 608 with the channel unit 608 and with each other during attachment of the multi-wing edge-lit structures 602, 604, 608 to the channel unit 608. For example, the tabs may be inserted into corresponding slots in the channel unit 608.

The channel unit 608 may also include one or more drivers (e.g., a driver 1210 shown FIG. 12C) that are configured to provide power to the LEDs of the multi-wing edge-lit structure 602, 604, and 606. The multi-wing edge-lit light fixture 600 also includes support cables 610 and 612 that are attached to opposite end portions of the channel unit 608 to enable the light fixture 600 to be suspended from, for example, a ceiling structure. In some example embodiments, the length of the channel unit 608 may be 2 feet, 4 feet, 6 feet, 8 feet, or 12 feet. In alternative embodiments, the multi-wing edge-lit light fixture 600 may not include the support cables 610 and 612 and may instead be surface mounted such that the channel unit 608 is mounted to a ceiling.

Although three multi-wing edge-lit structures 602, 604, 606 are shown attached to the channel unit 608 in FIGS. 6A-D, in alternative embodiments, the multi-wing edge-lit light fixture 600 may include fewer or more than three multi-wing edge-lit structures. Further, each edge-lit light guide panel of each of the multi-wing edge-lit structures 602, 604, 606 may have an orientation other than shown in FIGS. 6A-D. Although the multi-wing edge-lit structure 604 is smaller than the multi-wing edge-lit structures 602, 606 as shown in FIGS. 6A-D, in alternative embodiments, the multi-wing edge-lit structure 604 may be the same size or larger than one or both of the multi-wing edge-lit structures 602, 606. In some alternative embodiments, the channel unit 608 may be omitted.

FIGS. 7A-D illustrate a multi-wing edge-lit light fixture 700 that includes multiple multi-wing edge-lit structures 702, 704, 706 in various orientations relative to a channel unit 708 according to some example embodiments. As illustrated in FIGS. 7A-D, one or more multi-wing edge-lit structures are attached to a channel unit 708 in a perpendicular orientation relative to the channel unit 708. For example, in FIGS. 7A-D, the multi-wing edge-lit structure 704 is in a perpendicular orientation relative to the channel unit 708. In contrast, the multi-wing edge-lit structure 706 is in parallel orientation relative to the channel unit 708 in the example embodiment shown in FIG. 7B. In the example embodiments of FIGS. 7A-D, when one or more of the multi-wing edge-lit structures 702, 704, 706 are positioned in a perpendicular orientation relative to the channel unit 708, the tabs (e.g., tabs 514, 516 of FIG. 5) may be positioned outside of and on opposite sides of the channel unit 708.

Similar to the multi-wing edge-lit light fixture 600 of FIGS. 6A-D, the multi-wing edge-lit light fixture 600 may be suspended, for example, from a ceiling structure by support cables. Alternatively, the multi-wing edge-lit light fixture 700 may not include support cables and may instead be surface mounted to a ceiling. In some alternative embodiments, the channel unit 708 may be omitted.

Figure 8:
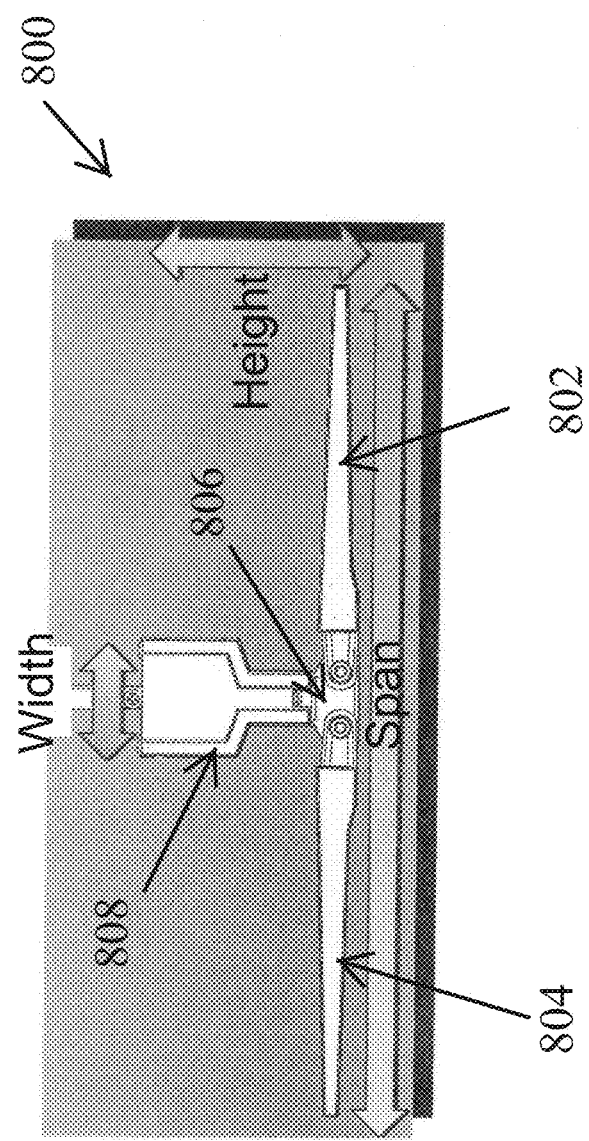
FIG. 8 illustrates a multi-wing edge-lit light fixture that includes a multi-wing edge-lit structure according to an example embodiment.

FIG. 8 illustrates a multi-wing edge-lit light fixture 800 that includes a multi-wing edge-lit structure according to an example embodiment. In some example embodiments, the multi-wing edge-lit light fixture 800 includes edge-lit light guide panels 802, 804 that are attached to a joiner unit 806. The joiner unit 806 is attached to a channel unit 808 that may include a driver to provide power to light sources (e.g., LEDs) that are in the edge-lit light guide panels 802, 804. Although the joiner unit 806 is positioned below the channel unit 808 in FIG. 8, in alternative embodiments, the joiner unit 806 may be positioned above or on either side of the channel unit 808. In some example embodiments, the span of the multi-wing edge-lit light fixture 800 is approximately 14.4 inches, and the height of the multi-wing edge-lit light fixture 800 is approximately 3.75 inches. The largest width of the channel unit 808 may be approximately 2 inches. In alternative embodiments, the span, height and width may be less or more than 14.4 inches, 3.75 inches, and 2 inches, respectively. In some example embodiments, the edge-lit light guide panels 802, 804 correspond to the edge-lit light guide panels 102, 104 of FIGS. 1A-C, and the joiner unit 806 corresponds to the joiner unit 106 of FIGS. 1A-C.

Figure 9C:
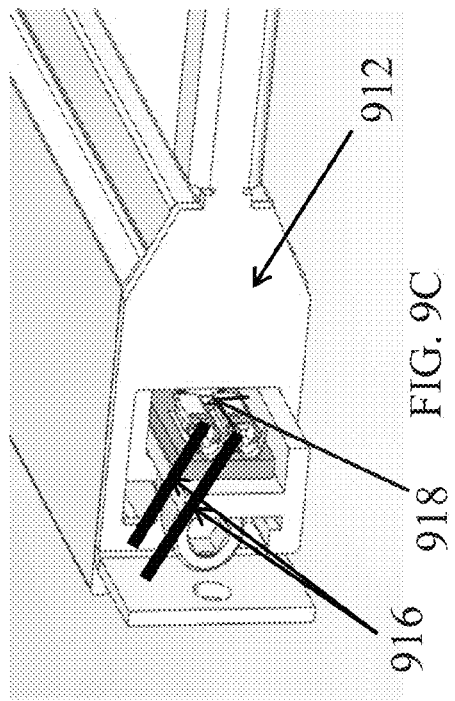
FIGS. 9A-F illustrate an edge-lit light guide panel at various stages of assembly according to an example embodiment.
Figure 9D:
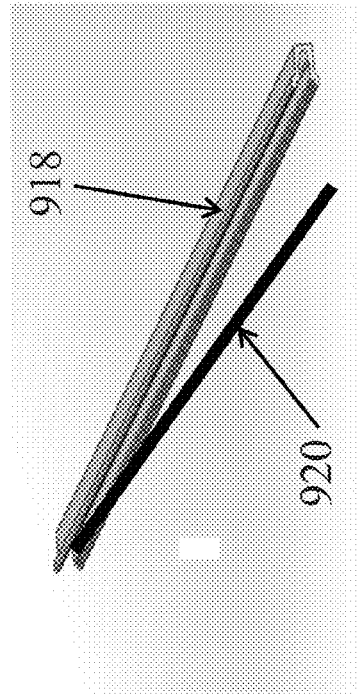
Figure 9A:
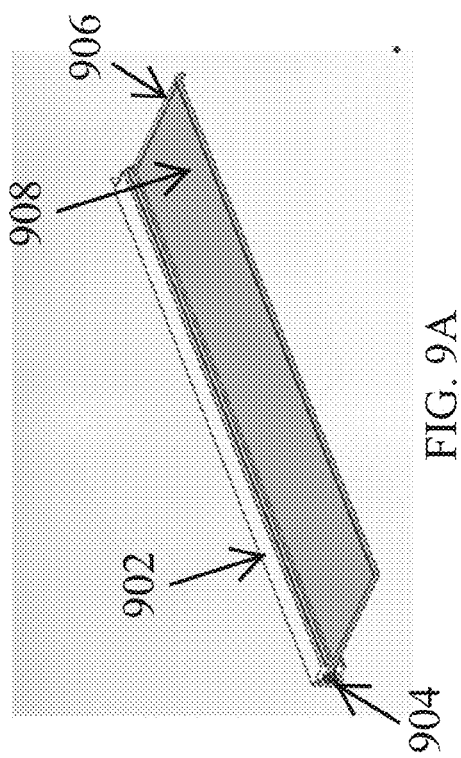
Figure 9B:
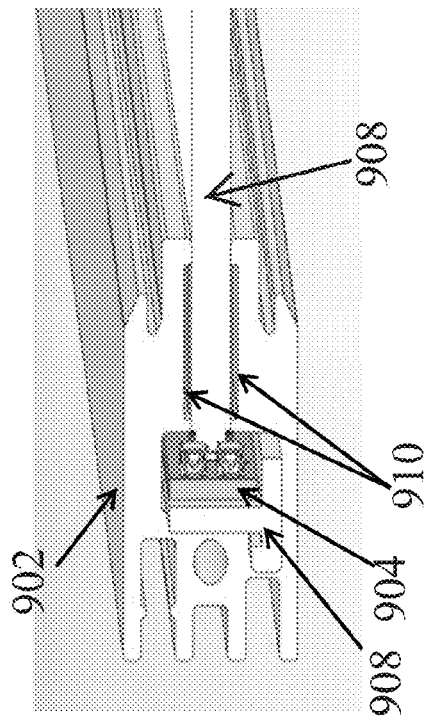

FIGS. 9A-F illustrate an edge-lit light guide panel 932 at various stages of assembly according to an example embodiment. In some example embodiments, the edge-lit light guide panel 932 corresponds to the edge-lit light guide panels 102, 104 of the multi-wing edge-lit structure 100 of FIGS. 1A-C. In FIG. 9A, a PCB including LEDs is inserted in a back frame 902, which corresponds to the back frames 108, 118 of FIG. 1A. An end bracket 906 is attached to the back frame 902 followed by insertion of a narrow side of a light guide 908, such as the light guides 116, 126 of FIG. 1A, in the back frame 902. In FIG. 9B, reflective films 910 may be optionally inserted between the light guide 908 and the back frame 902. As illustrated in FIG. 9B, the PCB 904 may be attached to an extruded heat sink 908 that is inserted in the back frame 902. For example, the PCB 904 including LEDs 910 (shown in FIG. 9C) may be first attached to the heat sink 908 prior to insertion in the back frame. In FIG. 9C, one or more wires 916 are attached to the PCB 904 that includes the LEDs 918. Power is provided to the LEDs using the one or more wires 916. In FIG. 9C, an end bracket 912 is also attached to the back frame 902. In FIG. 9D, a substrate 920 (e.g., a rubber substrate) is attached to a front frame. For example, the substrate 920 may push against the light guide 908 to maintain the light guide 908 close to the LEDs 918 shown in FIG. 9C.

Figure 9F:
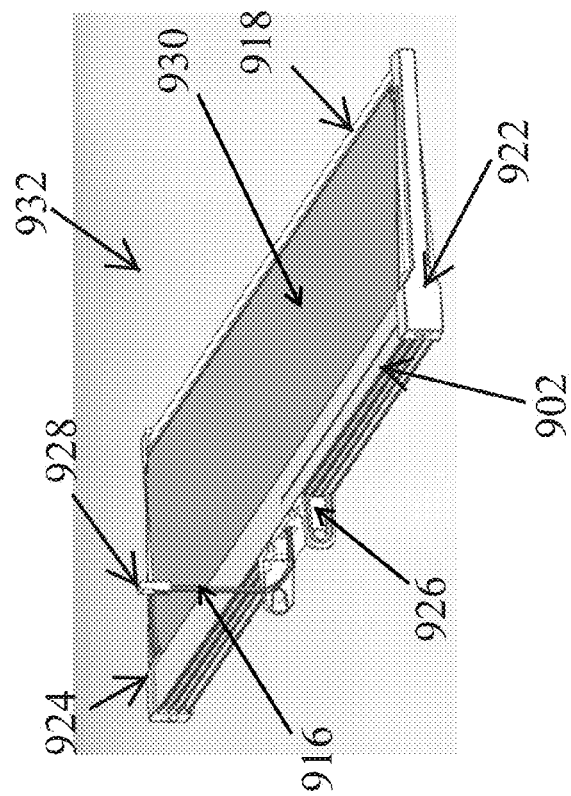
Figure 9E:
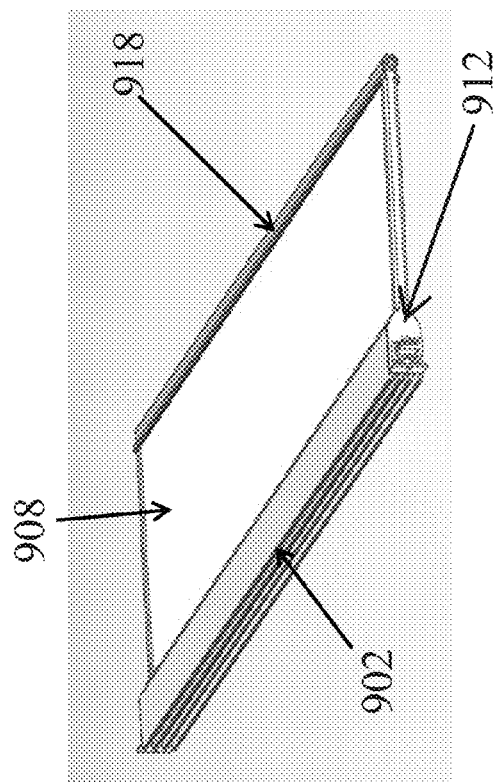

In FIG. 9E, the front frame 918 is attached to the narrow side of the light guide 908 and to the end bracket 912. In FIG. 9F, a bracket 926 is attached to the back frame 902, and side frames 922, 924 are attached. In some example embodiments, a protective film or a reflector 930 may be attached to the light guide 908. In some example embodiments, the back frame 902, the front frame 918, and the side frames 922, 924 correspond to the back frame, the front frame, and the side frames of the edge-lit light guide panels 102, 104 of the multi-wing edge-lit structure 100 of FIGS. 1A-C. In some example embodiments, some of the above described steps may be performed in a different order than described, may be combined, or may not be required.

Figure 10B:
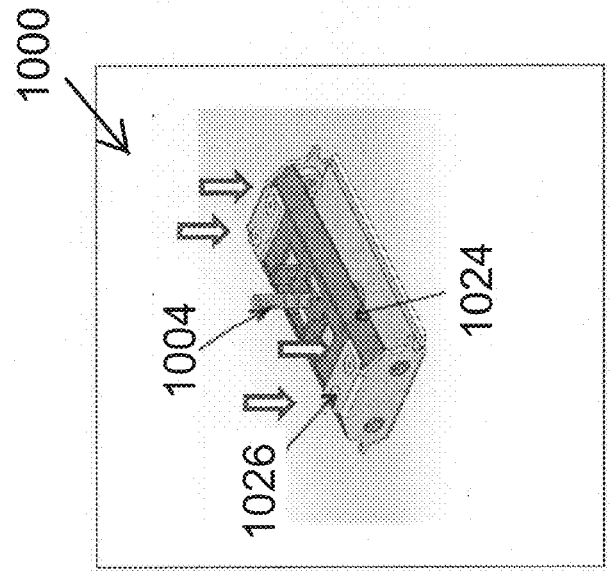
FIGS. 10A-B illustrate assembly of a joiner unit according to an example embodiment.
Figure 10A:
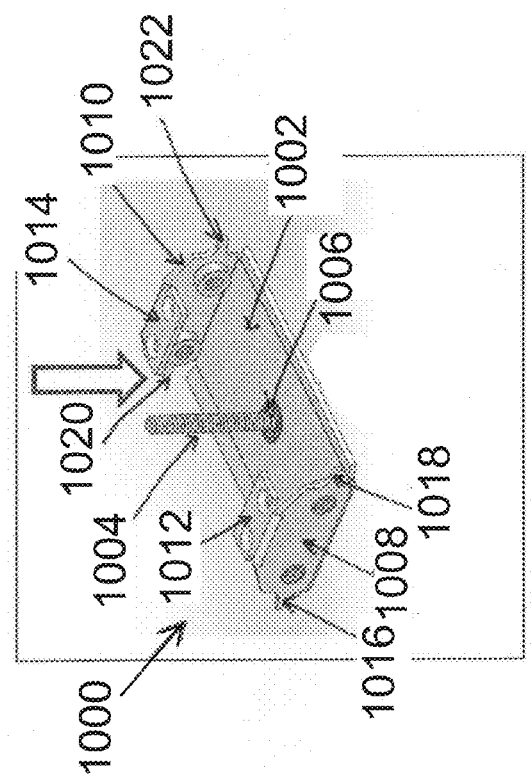

FIGS. 10A-B illustrate assembly of a joiner unit 1000 according to an example embodiment. The joiner unit 1000 may correspond to the joiner unit 106 of the multi-wing edge-lit structure 100 of FIGS. 1A-C. In FIG. 10A, a holding screw 1004 is inserted into an aperture 1006 of a bottom plate 1002 of a joiner frame 1000. The joiner frame 1000 includes side walls 1008, 1010, and flanges 1012, 1014 extending from the respective side wall. The flanges 1012 and 1014 include one or more apertures. The side walls 1008 and 1010 include one or more apertures that enable a knuckle of an edge-lit light guide panel to be adjustably attached to the joiner unit 1000 by a fastener.

The side wall 1008 includes protrusions 1016 and 1018. Each of the protrusions 1016 and 1018 may be inserted into a respective notch (e.g., one of the notches 402 of FIG. 4) of a knuckle of a respective edge-lit light guide panel, such as the edge-lit light guide panels 102, 104 of FIGS. 3A and 3B, to set an orientation of the edge-lit light guide panel. Similarly, the side wall 1010 includes protrusions 1020 and 1022 that operate in a similar manner as the protrusions 1016 and 1018. In FIG. 10B, a metal plate (e.g., the metal plate 504 of FIG. 5) that has one or more wire routing openings and one or more alignment tabs is attached to the flanges 1012, 1014 using one or more fasteners 1026. For example, the fasteners 1026 (e.g., rivets) may be flush with the surface of the flanges 1012, 1014.

FIG. 11 illustrates a multi-wing edge-lit structure 1100 according to an example embodiment. FIG. 11 illustrates an edge-lit light guide panel 1102 that is attached to the joiner unit 1106. A second edge-lit light guide panel 1104 is being attached to the joiner unit 1106 by attaching the knuckle 1108 of the second edge-lit light guide panel 1104 to the joiner unit 1106. Fasteners 1112 and 1114 may be used to attach the knuckle 1108 to the joiner unit 1106. As illustrated in FIG. 11, one or more wires 1110 that are coupled LEDs of the edge-lit light guide panel 1102 are routed through the joiner unit 1106. One or more wires 1116 may be routed through the joiner unit 1106 in a similar manner as the one or more wires 1110. In some example embodiments, the edge-lit light guide panel 1102 and the edge-lit light guide panel 1104 correspond to the edge-lit light guide panels 102, 104 of FIG. 1A, respectively.

Figure 12A:
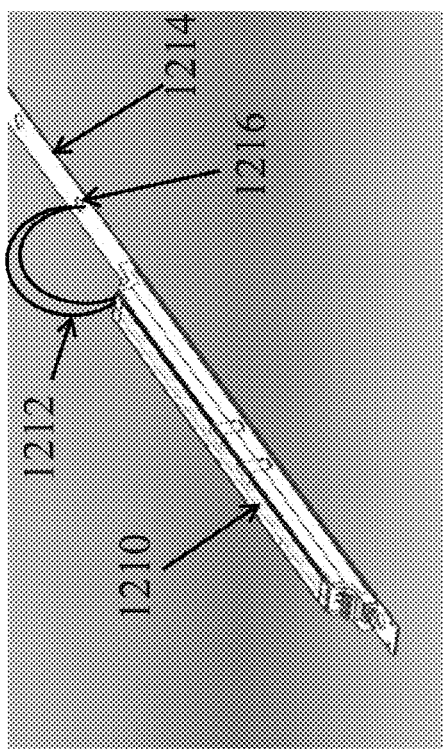
Figure 12C:
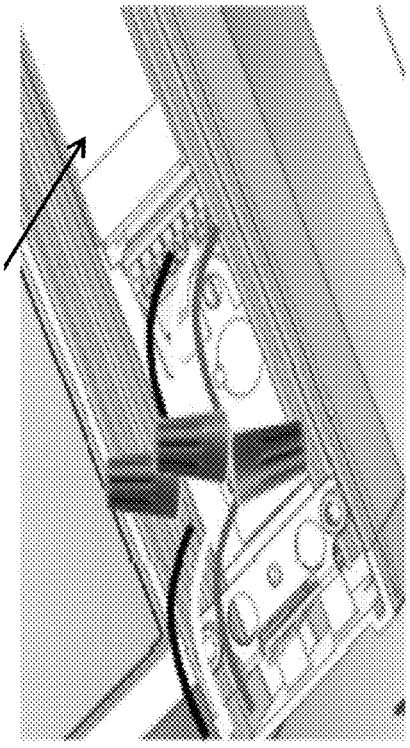
Figure 12B:
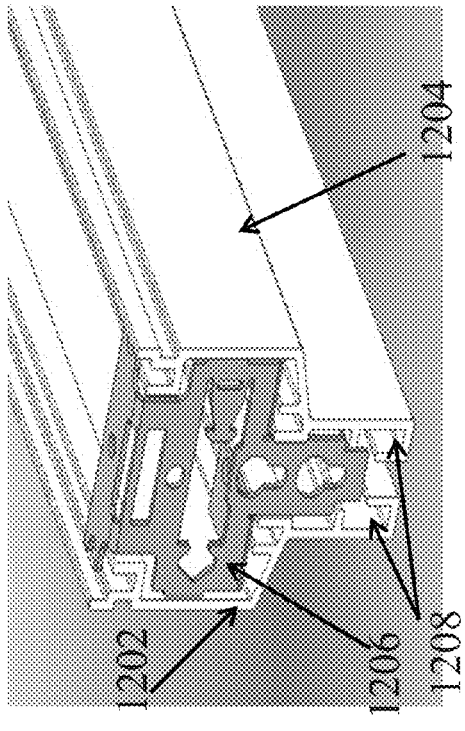

FIGS. 12A-I illustrate a channel unit 1230 at various stages of assembly according to an example embodiment. In some example embodiments, the channel unit 1230 corresponds to the channel unit 608 of FIGS. 6A-D and the channel unit 708 of FIGS. 7A-D. In FIG. 12A, an end bracket 1206 is attached to channel segments 1202, 1204 hold the channel segments 1202, 1204 together. For example, screws may be used to attach the end bracket 1206 to the channel segments 1202, 1204. The channel segments 1202, 1204 include spacer channels 1208 for inserting a spacer 1218 (shown in FIG. 12B, which shows the spacer 1212 with the end bracket 1206 removed). The spacer 1218 servers to retain the channel segments 1202, 1204 together. As illustrated in FIG. 12B, the spacer 1218 includes apertures 1222, 1224. For example, the aperture 1224 may be used to route wires to and from a driver (such as a driver 1210 shown in FIG. 12C) that is positioned a cavity 1220. The other aperture 1224 may be used to attach a joiner unit, such as the joiner unit 106 of FIG. 1A and the holder unit 1000 of FIG. 10B, using a holder screw, such as the holder screw 502 of FIG. 5 and the holder screw 1004 of FIG. 10B.

Figure 12D:
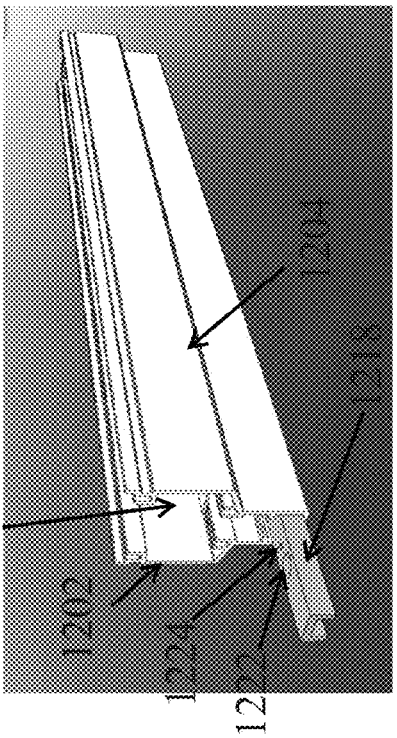
Figure 12E:
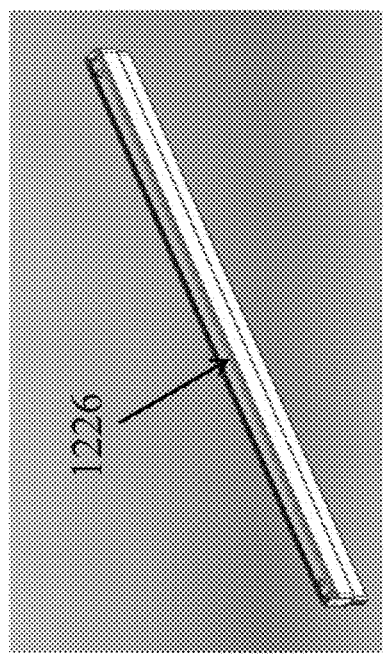
Figure 12G:
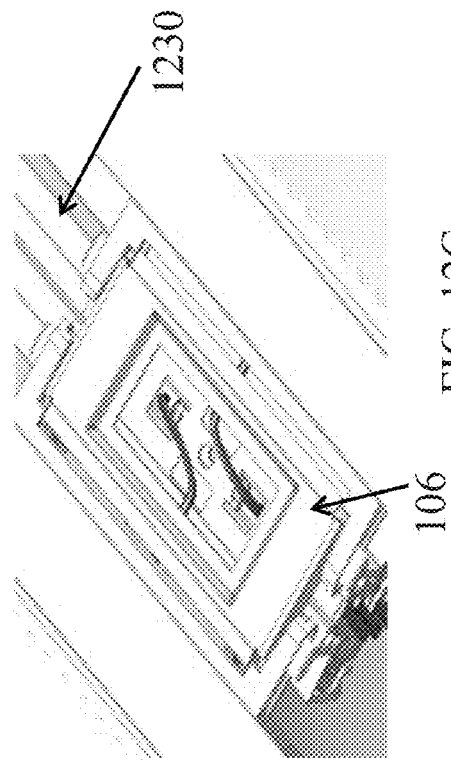
Figure 12F:
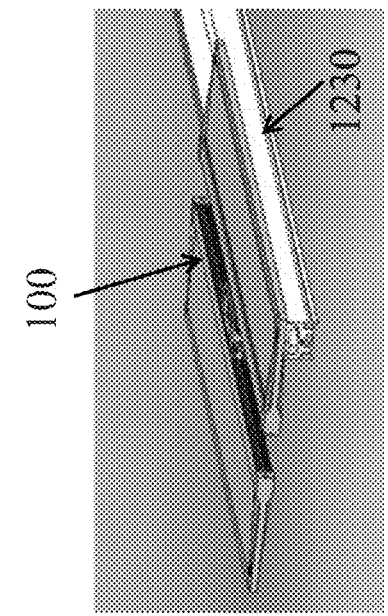
Figure 12H:
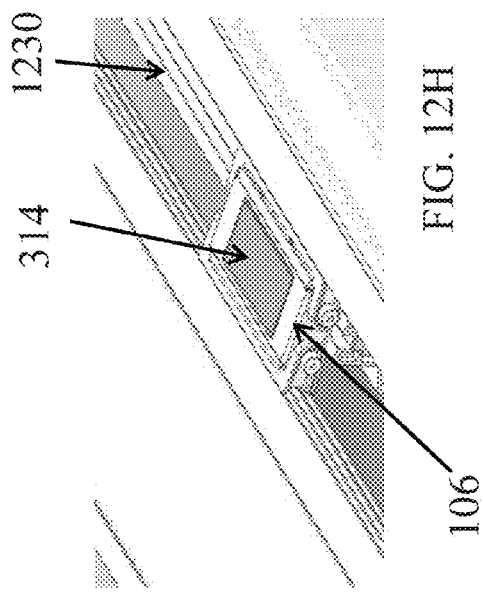

In FIG. 12C, the driver 1210 is attached to a bracket 1214 that has one or more openings 1216 for routing one or more wires 1212 to and from the driver 1210. In FIG. 12D, the driver 1210 and the bracket 1214 are positioned in the cavity 1220, and additional wiring connections are made. In FIG. 12E, cover 1226 is attached over the cavity 1220 shown in FIG. 12B. In FIG. 12F, the multi-wing edge-lit structure 100 is positioned over the channel unit 1230 such that the joiner unit 106 is attached to the channel unit 1230. In FIG. 12G, any necessary wire connections and wire routings are performed including inside the joiner unit 106. In FIG. 12H, the joiner unit 106 placing the cover 314 over a cavity in the joiner unit 106. In FIG. 12I, one or more other multi-wing edge-lit structures 100 are attached to the channel unit 1230 in a similar manner described above.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A multi-wing edge-lit structure, comprising:
   a first edge-lit light guide panel;
   a second edge-lit light guide panel; and
   a joiner unit, wherein the first edge-lit light guide panel is adjustably attached to the joiner unit on a first side of the joiner unit, wherein the second edge-lit light guide panel is adjustably attached to the joiner unit on a second side of the joiner unit, and wherein the first side and the second side are opposite sides of the joiner unit, wherein the first edge-lit light guide panel comprises a knuckle fixedly attached to a back frame of the first edge-lit light guide panel, wherein the knuckle includes a first arm, a second arm, and a wall extending between the first arm and the second arm, the wall having an opening therethrough for routing an electrical wire to a light source of the first edge-lit light guide panel.

2. The multi-wing edge-lit structure of claim 1, wherein the first edge-lit light guide panel and the second edge-lit light guide panel are rotatable relative to the joiner unit.

3. The multi-wing edge-lit structure of claim 1, wherein the first edge-lit light guide panel and the second edge-lit light guide panel are adjustable independent of each other.

4. The multi-wing edge-lit structure of claim 1, wherein the first edge-lit light guide panel includes a first light guide that emits light through a broad side of the first light guide and wherein the second edge-lit light guide panel includes a second light guide that emits light through a broad side of the second light guide.

5. The multi-wing edge-lit structure of claim 4, wherein the first edge-lit light guide panel and the second edge-lit light guide panel each include a front frame, a first side frame, and a second side frame, wherein the first arm is spaced from a first side frame of the first edge-lit light guide panel, wherein the second arm is spaced from a second side frame of the first edge-lit light guide panel, and wherein the first side frame of the first edge-lit light guide panel and the second side frame of the first edge-lit light guide panel are on opposite sides of the first edge-lit light guide panel.

6. The multi-wing edge-lit structure of claim 5, wherein the back frame of the first edge-lit light guide panel and the front frame of the first edge-lit light guide panel are positioned at opposite narrow sides of the first light guide panel and wherein a back frame of the second edge-lit light guide panel and the front frame of the second light guide panel are positioned at opposite narrow sides of the second edge-lit light guide panel.

7. The multi-wing edge-lit structure of claim 5, wherein the knuckle is rotatably attached to the joiner unit on the first side of the joiner unit and wherein the second edge-lit light guide panel includes a second knuckle fixedly attached to the back frame of the second edge-lit light guide panel and rotatably attached to the joiner unit on the second side of the joiner unit.

8. The multi-wing edge-lit structure of claim 7, wherein the first edge-lit light guide panel includes a first light source, wherein the second edge-lit light guide panel includes a second light source, wherein the first light source is positioned proximal to a narrow edge of the first light guide of the first edge-lit light guide panel, and wherein the second light source is positioned proximal to a narrow edge of the second light guide of the second edge-lit light guide panel.

9. The multi-wing edge-lit structure of claim 8, wherein the second knuckle includes a second opening for routing a second electrical wire used to provide power to the second light source of the second edge-lit light guide panel.

10. The multi-wing edge-lit structure of claim 1, wherein the joiner unit includes one or more wire routing openings for routing one or more wires to the first edge-lit light guide panel and to the second edge-lit light guide panel.

11. A multi-wing edge-lit light fixture, comprising:
a multi-wing edge-lit structure, comprising:
a first edge-lit light guide panel;
a second edge-lit light guide panel;
a joiner unit, wherein the first edge-lit light guide panel is adjustably attached to the joiner unit on a first side of the joiner unit, wherein the second edge-lit light guide panel is adjustably attached to the joiner unit on a second side of the joiner unit, and wherein the first side and the second side are opposite sides of the joiner unit, wherein the first edge-lit light guide panel comprises a knuckle fixedly attached to a back frame of the first edge-lit light guide panel, wherein the knuckle includes a first arm, a second arm, and a wall extending between the first arm and the second arm, the wall having an opening therethrough for routing an electrical wire to a light source of the first edge-lit light guide panel; and
a channel unit attached to the joiner unit, wherein the channel unit includes a driver that provides power to the multi-wing edge-lit structure.

12. The multi-wing edge-lit light fixture of claim 11, further comprising a first support cable and a second support cable for suspending the multi-wing edge-lit lighting structure.

13. The multi-wing edge-lit light fixture of claim 11, wherein the joiner unit includes one or more tabs extending upwardly from the joiner unit and wherein the one or more tabs are used to align the multi-wing edge-lit structure 100 with the channel unit.

14. The multi-wing edge-lit fixture of claim 11, wherein the first edge-lit light guide panel and the second edge-lit light guide panel each include a back frame, a front frame, a first side frame, and a second side frame.

15. The multi-wing edge-lit fixture of claim 14, wherein the knuckle is rotatably attached to the joiner unit on the first side of the joiner unit and wherein the second edge-lit light guide panel includes a second knuckle fixedly attached to the back frame of the second edge-lit light guide panel and rotatably attached to the joiner unit on the second side of the joiner unit.

16. The multi-wing edge-lit fixture of claim 15, wherein the first edge-lit light guide panel includes a first light source, wherein the second edge-lit light guide panel includes a second light source, wherein the first light source is positioned proximal to a narrow edge of the first light guide of the first edge-lit light guide panel, and wherein the second light source is positioned proximal to a narrow edge of the second light guide of the second edge-lit light guide panel.

17. The multi-wing edge-lit fixture of claim 16, wherein the first knuckle includes a first opening for routing a first electrical wire to the first light source of the first edge-lit light guide panel and wherein the second knuckle includes a second opening for routing a second electrical wire to the second light source of the second edge-lit light guide panel.

18. The multi-wing edge-lit light fixture of claim 11, further comprising a second multi-wing edge-lit structure attached to the channel unit and a third multi-wing edge-lit structure attached to the channel unit, and wherein the second multi-wing edge-lit structure is positioned between the multi-wing edge-lit structure and the third multi-wing edge-lit structure.

19. A multi-wing edge-lit light fixture, comprising:
a first multi-wing edge-lit structure;
a second multi-wing edge-lit structure;
a channel unit attached to the first multi-wing edge-lit structure and to the second multi-wing edge-lit structure, wherein the first multi-wing edge-lit structure and the second multi-wing edge-lit structure each comprise:
a first edge-lit light guide panel;
a second edge-lit light guide panel;
a joiner unit, wherein the first edge-lit light guide panel is adjustably attached to the joiner unit on a first side of the joiner unit, wherein the second edge-lit light guide panel is adjustably attached to the joiner unit on a second side of the joiner unit, wherein the first side and the second side are opposite sides of the joiner unit, and wherein the first multi-wing edge-lit structure and the second multi-wing edge-lit structure are independently adjustable relative to the channel unit; and wherein the first edge-lit light guide panel comprises a knuckle fixedly attached to a back frame of the first edge-lit light guide panel, wherein the knuckle includes a first arm, a second arm, and a wall extending between the first arm and the second arm, the wall having an opening therethrough for routing an electrical wire to a light source of the first edge-lit light guide panel.

20. The multi-wing edge-lit light fixture of claim 19, further comprising a third multi-wing edge-lit structure, wherein the second edge-lit light structure and the third multi-wing edge-lit structure are oriented in different directions relative to the channel unit.

\* \* \* \* \*